May 4, 1937.                R. C. BURT                2,079,241
APPARATUS FOR SEPARATING METALLIC MIXTURES
Filed Feb. 1, 1932           2 Sheets-Sheet 1
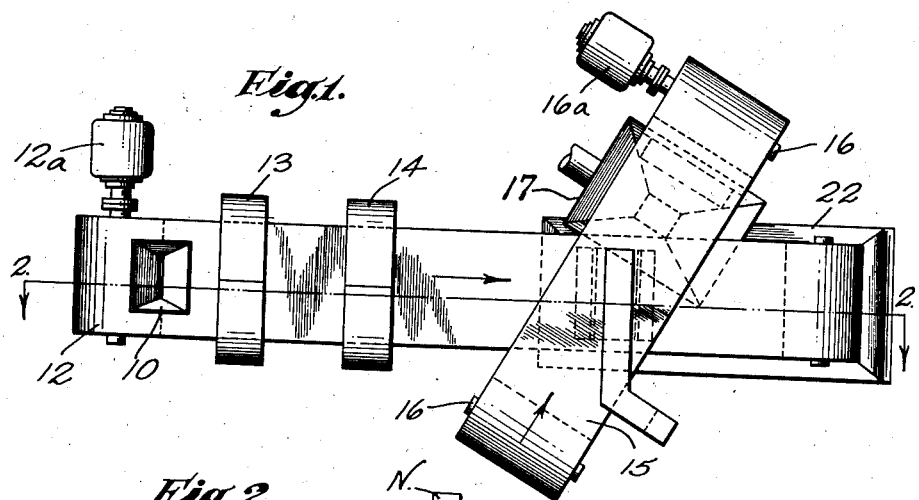
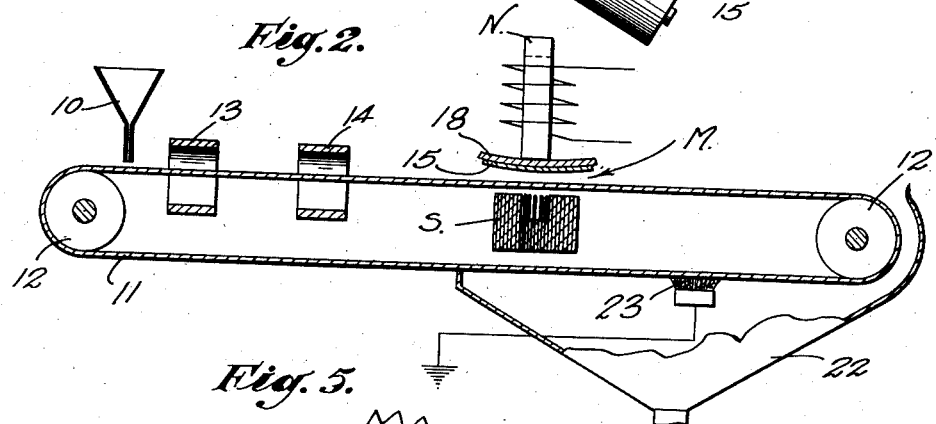
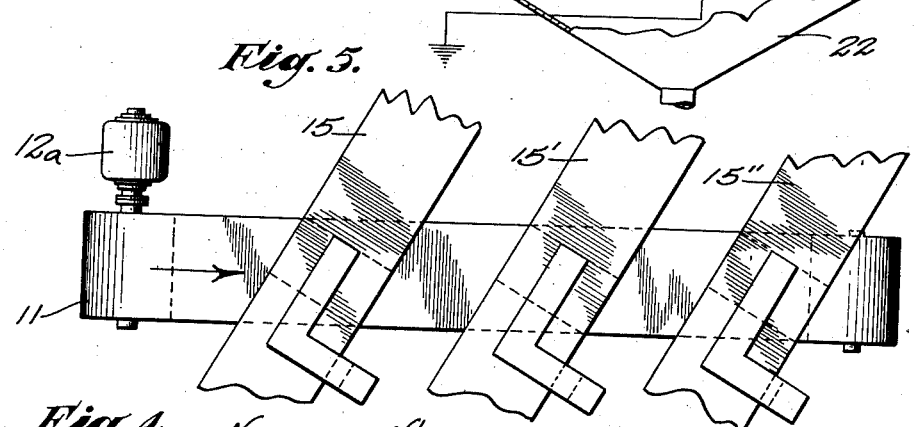
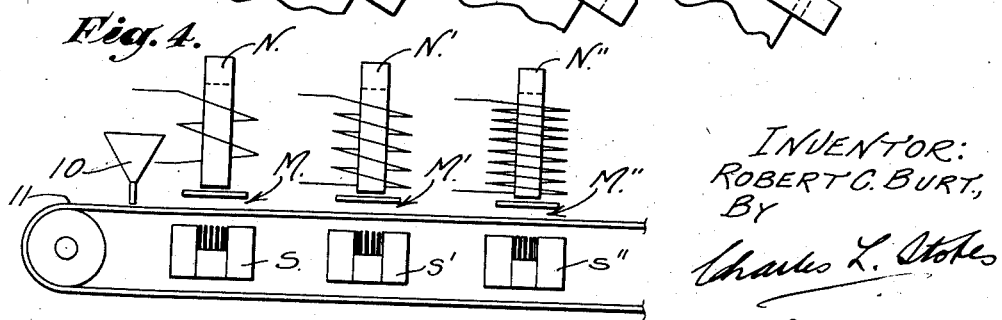
INVENTOR:
ROBERT C. BURT,
BY
Charles L. Stokes
ATTORNEY.

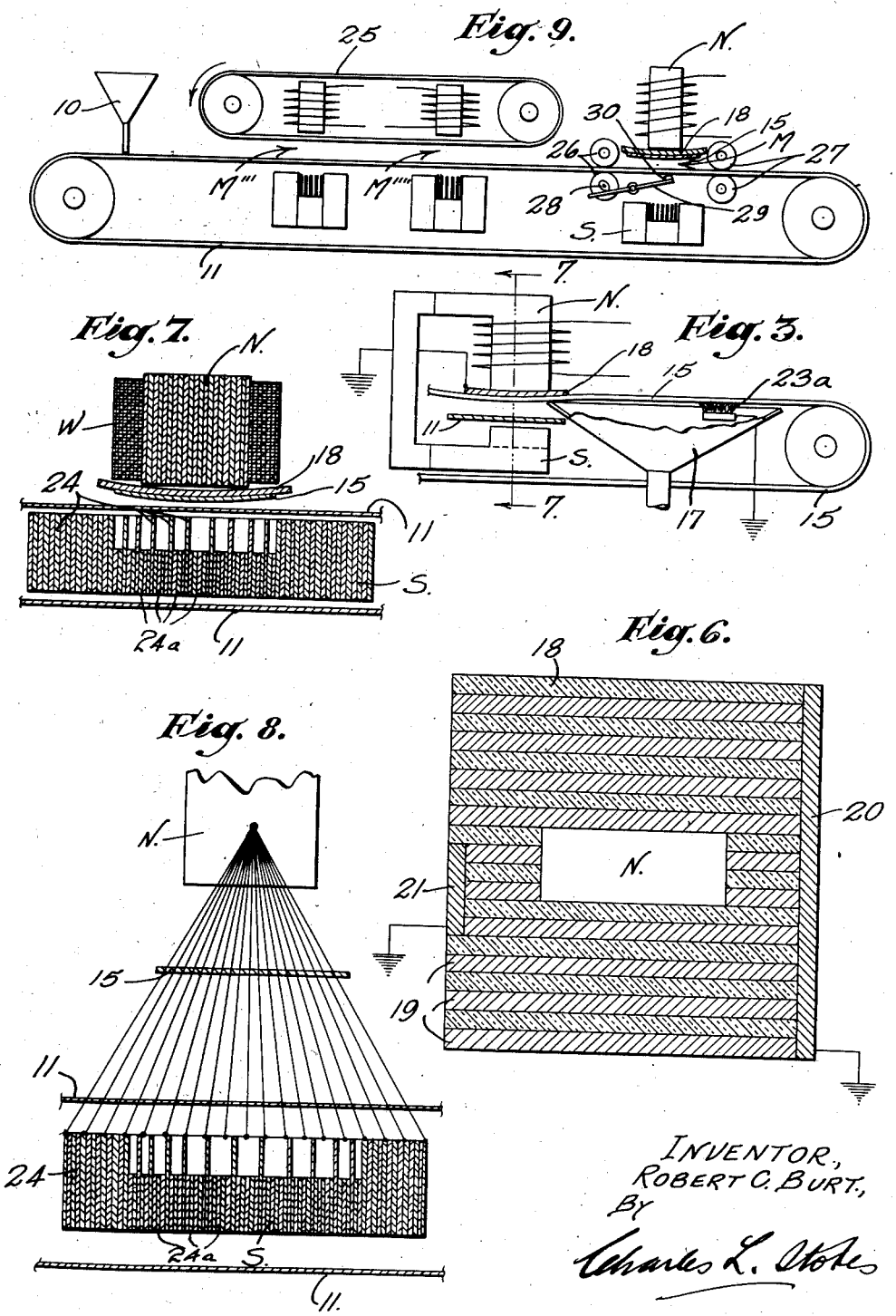

Patented May 4, 1937

2,079,241

UNITED STATES PATENT OFFICE 2,079,241

APPARATUS FOR SEPARATING METALLIC MIXTURES

Robert Cady Burt, Pasadena, Calif.

Application February 1, 1932, Serial No. 590,095

5 Claims. (Cl. 175—21)

This invention relates to apparatus for separating magnetized iron particles from the noble metals, such as gold, platinum or the like, and impurities such as sand, quartz and the like, and has for its principal object the treatment of concentrates from mining operations from which it is at present impossible to ultimately separate the magnetite from the particles of gold, platinum, iridium, etc., which are occluded by the magnetite.

In its broadest aspects, the invention is not limited to the treatment of mine concentrates containing magnetite and precious metals, but is applicable to obtaining complete separation of ferrous metals susceptible to magnetic influence from materials having no magnetic susceptibility.

At the present time, there are large quantities of materials available from mining operations, principally from placer mines, comprised mainly of magnetite containing particles of noble metals, such as gold, platinum and iridium.

Such materials, depending on the value of the noble metals contained therein, are saved as concentrates to be smelted for the recovery of the noble metals therein, but, if the values they contain are insufficient to warrant smelting they are wasted by being dumped.

The smelter treatment of such concentrates involves a heat treatment and is relatively expensive so that it is impractical to smelt such concentrates containing comparatively low values in gold, etc.

It is an object of this invention, therefore, to subject an aggregate containing ferrous metals having magnetic susceptibility and noble metals to a magnetic treatment whereby the ferrous metals are substantially completely separated from the aggregate.

It is a further object of the invention to separate with extreme simplicity and economy certain ferrous metals, or alloys, susceptible to a magnetic field, from certain noble metals and especially from such mixtures of metals as are at the present time incapable of being economically separated magnetically.

Referring to the drawings:

Fig. 1 is a plan view of a suitable apparatus.

Fig. 2 is an elevation, partly in section, along the lines 2—2 of Fig. 1.

Fig. 3 is a side view of a part of Figs. 1 and 2.

Fig. 4 is a side view of an alternative construction of Figs. 1 and 2.

Fig. 5 is a plan view of Fig. 4.

Fig. 6 is a detail showing how a pole of the magnets employed is guarded against friction.

Fig. 7 is a sectional view along the lines 7—7 of Fig. 3.

Fig. 8 is a diagram showing an ideal distribution of the lines of force in the magnetic field of Fig. 7.

Fig. 9 is a side view of apparatus showing modifications of Figs. 1 to 5.

It will be seen that a hopper 10 is adapted to supply a pulverized mixture of magnetite, noble metals and sand to a carrier belt 11. Such mixture is a dry mixture in which the particle size of the components does not preferably exceed one-eighth of an inch (1/8") in length and of varying cross-sectional dimensions not exceeding a square one thirty-second of an inch on the side. A desirable mixture to be treated is dry, free flowing, and is of more or less uniform size corresponding roughly to sand.

Carrier belt 11 is a conveyor made of fibre, canvas, or other suitable non-magnetic composition which passes over wheels 12, to one of which power is applied in any well known manner, as by a motor 12a, whereby the dried mixture in film form of minimum thickness is passed between the poles of a series of magnets 13 and 14.

Said magnets are illustrated as fixed magnets providing magnetic fields of reversed polarity in series to the end that ferrous particles passing through said fields are agitated by being turned end for end and brought to the surface of the film of mixture carried by belt 11 through the fields, but other types of magnetic fields may be arranged to achieve the desired results.

Such action provides that the ferrous particles to be separated are in a position most suitable for their complete removal from the remaining metals and/or sand on belt 11 under the succeeding steps of the process.

The stratified mixture then is conveyed by belt 11 into a magnetic field indicated at M which is prepared by having one pole N above belt 11 and the other pole S below said belt, as more particularly illustrated in Fig. 3.

The poles N and S are so arranged as to give a distorted magnetic field, the magnet as a whole being of laminated structure operable by alternating current, pulsating current, or interrupted direct current, so that the intensity of the field is concentrated at the face of pole N, a few only of the laminations extending from between the legs of pole S to give directional force to the intensity at pole N; it being particularly noted that the belt 11 runs between the poles N and S distant from pole N.

The magnetic field is thus so distorted that, as the mixture is brought within its influence, the ferrous particles commence to oscillate individually with the alternations, or pulsations, of current of predetermined frequency whereby as they approach the face of pole N on belt 11, the oscillations of the particles are magnified to the point where said particles are caused to concentrate within the sphere of maximum magnetic intensity upon a carrier, or delivery, belt 15 which moves in a path transversely of belt 11; such path being preferably at a slight angle as illustrated, but it may be at a right angle, and belt 15 travels much closer to pole N than to pole S for the purpose of removing the ferrous particles from magnetic field M.

Carrier belt 15 is constructed of material similar to belt 11 and passes over wheels 16, to one of which power is applied in any suitable manner as by a motor 16a, the ferrous particles adhering to belt 15 by reason of the concentrated magnetic field at the face of pole N until they pass out from the influence of said concentrated field, whereupon the particles drop by gravity into a chute 17 for further treatment, or disposal.

The face of pole N is inserted in a curved block of bakelite 18, or other similar dielectric material, giving minimum frictional effects to the end that belt 15 is held in engagement therewith to be brought as close as possible to the face of pole N, and preferably there is not to exceed one-sixteenth of an inch of bakelite between belt 15 and the face of pole N, or if the center of block 18 is cored out to receive pole N, there would be no more than one-sixteenth of an inch air gap left under at least one operative condition.

Block 18 is preferably inlaid with strips of non-magnetic electrical conductor 19, such as copper or other suitable conductor, which alternate with ridges of bakelite, the ends of the conductor strips being connected by bars 20 and 21 to be grounded, whereby belt 15 is relieved of any charge of static, it being understood that belt 11 may be similarly grounded.

Such grounding to remove static is important, inasmuch as it decreases the tendency of certain earthy particles containing the noble metals to adhere to belt 15 together with the ferrous particles desired to be removed and thereby largely increases the recovery of values.

The sand, together with the particles of noble metals, and/or other non-magnetic material is passed by conveyor 11 into a chute 22 whence it is taken for treatment for the recovery of the gold, etc. in any of several well known processes, the under side of conveyor 11 being swept by a transversely placed metallic brush 23, whereby any fine adhering particles are removed and drop into chute 22; said brush 23 serving additionally to further remove static from belt 11 by being grounded, and belt 15 may be similarly swept and grounded by the application of a similar grounded metallic brush 23a.

It will thus be seen that the mixture of ferrous and other particles is carried through a comparatively lengthy magnetic field of increasing intensity to a zone of concentrated intensity wherein a complete separation of the ferrous particles occurs, and such separated particles are removed by gravity as soon as they pass through said concentrated zone.

It will be noted that the magnetic field increases in intensity towards the face of pole N to the end that individual oscillations of increasing intensity are induced in the ferrous particles up to the point when they are caused to be held against the belt 15. Such oscillations are important, as they provide a separating effect by shaking off the particles of gold, etc., and further provide that the final separation does not occur en masse but as individual particles, the oscillations removing the ferrous particles from, and depositing the same on, the surface of the film of non-ferrous particles, thereby preventing such occlusion of the noble metals as would occur if the ferrous particles were taken off simultaneously.

While the poles N and S may be placed at right angles to the direction of travel of belt 11, as shown in Figs. 1, 2 and 3, a construction as shown in Figs. 4 and 5 is preferred.

In Figs. 4 and 5 the belt 11 conveys the mixture to be separated through magnetic fields M, M' and M'' which are not only of the type before described, having distorted magnetic fields of increasing intensity, but the windings of the poles N, N' and N'' are such as to provide a plurality of magnetic fields increasing in intensity serially, such construction assuring the ultimate separation of the last of the ferrous particles.

Such ultimate separation is furthermore aided by not only running belts 15, 15' and 15'' transversely of conveyor 11 at an angle tending towards the direction of travel of conveyor 11 but further by placing the longitudinal axis of the poles of the magnets parallel to the direction of travel of belts 15, 15' and 15''.

This arrangement is made so that the longitudinal axis of the pole N of the magnet approaches a resultant of the lines of travel of belts 11 and 15, whereby a lessened transverse sweeping of the film of noble metals, etc. on belt 11 will occur when the final removal oscillations of the ferrous particles takes place.

In Figs. 7 and 8 the construction and theory of operation of the magnets are illustrated. In Fig. 7, both poles are shown to be made of a series of iron laminations suitably bound together, pole N being surrounded by windings W adapted to pass a current of the proper intensity, type and frequency. Pole S is of great length when compared with pole N and is generally of U form in cross-section, being constructed of laminations which are solid at the legs of the U and which has further spaced laminations 24 extending between the legs of the U whereby a distorted magnetic field having equally spaced lines of force per unit of length is provided; the laminations 24 being of the form of the magnet as a whole and being held apart by smaller laminations 24a between the legs of the U.

This is accomplished by decreasing the spacing of laminations 24 from the center of pole S towards the legs of the U so that said laminations finally come to a solidly bound form at said legs; the spacing being calculated for a desired field to approach the ideal field, as shown in Fig. 8, and the length of the field as illustrated therein comprises the length of the transverse section of the pole S.

This structure provides that the lines of force concentrate towards the pole N, and the cutting of said lines of force by the belt 15 is at such a position that the concentration of the lines of force between the poles is unbalanced, whereby the ferrous particles are caused to adhere to belt 15 within a concentrated portion of the magnetic field.

Such type of field having alternations, pulsations, or interruptions of a desired frequency has, moreover, another function. As the ferrous particles on belt 11 are brought within the influence of the lines of force they commence to oscillate vertically and individually. This action assures that said particles are caused to work through the film of aggregate on belt 11 to reach the surface of said film, at times being lifted clear of the film and dropped back thereon, so that as said particles approach the vertical common axis of poles N and S they are in a proper position to respond to the final oscillation which causes them to finally separate from said film free of any occluded material.

This is most important in practice wherein it is possible to remove in excess of 99% of the magnetite from concentrates of the class described, thus leaving large values in gold, platinum, etc. in easily recoverable form.

Not only are such large removal percentages possible but it is possible to construct a magnetic separator of the type described having but one-tenth the weight, using but one-fiftieth the power, and costing but one-fiftieth of the price of present known magnetic separators of equal throughput capacity but which, nevertheless, cannot fully separate the ferrous particles without carrying over a large percentage of undesired materials.

In other words, while known magnetic separators may extract all ferrous particles from a certain aggregate this separation cannot be done cleanly or economically, because said particles generally move en masse carrying some of the sand, etc. along with them.

It is believed that one of the principal reasons for a clean separation in the present process is that the oscillations of the ferrous particles are always in a vertical direction, or in a direction which assures no transverse sweeping of the aggregate by the particles when they finally leave the aggregate.

If such transverse sweeping should occur, it is obvious that the inertia of the ferrous particles will cause the removal by impact of undesired particles and therefore a decrease in efficiency.

To further assure a stratification of the particles, with the ferrous particles on the surface of the film, the modification in Fig. 9 provides that a parallel belt 25 is placed over a portion of belt 11 and having its lower face travelling in the same direction as the upper face of belt 11. A plurality of magnetic fields M''' and M'''' are arranged similarly to field M whereby the ferrous particles are lifted clear of the film of aggregate on belt 11 and again deposited on the surface of said film outside the influence of each successive field so that on approaching the final field M, the particles are in a position for clean and complete removal as described.

Such removal may likewise be facilitated by passing a limited section of belt 11 between two or more sets of rollers 26 and 27 which are adapted to run on the edges of belt 11 and hold said limited section when under the pole N.

The spindle 28 of the lower roller 26 terminates in a cam-like shape to contact with a pivoted agitating lever 29, the impact point 30 of which is so weighted as to keep lever 29 always in contact with spindle 28.

This structure provides that vibration shall be imparted to the film on belt 11 and is an aid to the spreading of said film surfaced with ferrous particles should said particles have any tendency to bunch whereby on their removal valuable material may be swept off.

It is of course obvious that any kind of vibrator having a required frequency may be substituted for lever 29 and that similar vibrators may be arranged for the fields M''' and M''''.

The frequency of oscillation of the ferrous particles is inaugurated in accordance with the size of said particles.

In general a high frequency is not as desirable as a low frequency but a frequency of less than ten cycles per second is too low. It may be stated that a frequency of between 10 cycles and 25 cycles gives good results on finely pulverized material as described.

In the appended claims, the term "pulsating current" is not to be interpreted as being limited to a pulsating current but is intended to be given its broadest meaning so as to include other suitable types of current such as alternating current and/or interrupted direct current.

I claim as my invention:

1. An electromagnet comprising a plurality of longitudinally U-shaped iron laminations held together to form an upper pole and a lower pole, and a winding for the upper pole adapted to pass a pulsating current therethrough; said lower pole being U-shaped transversely to provide solid legs of laminations on the ends and having a depressed portion between said legs wherein full size laminations are placed at spaced points.

2. An electromagnet comprising a plurality of longitudinally U-shaped iron laminations held together to form an upper pole and a lower pole, and a winding for the upper pole adapted to pass a pulsating current therethrough; said lower pole being U-shaped transversely to provide solid legs of laminations on the ends and having a depressed portion between said legs wherein full size laminations are placed at spaced points and decreasing in spaced distances each way from the center of the depression toward the solid legs.

3. An electromagnet comprising a plurality of longitudinally U-shaped iron laminations held together to form an upper pole and a lower pole, and a winding for the upper pole adapted to pass a pulsating current therethrough; said lower pole being U-shaped transversely to provide solid legs of laminations on the ends and having a depressed portion between said legs wherein full size laminations are placed at spaced points and the overall length of said depression being about equal to the overall length of said upper pole.

4. An electromagnet comprising an upper pole having a face of rectangular area and sides at right angles thereto, a lower pole generally U-shaped in cross-section having a gradually decreasing thickness of metal from the outer toward the inner portion of its facial area, and a winding adapted to create a magnetic field between said poles; said magnetic field having transverse cross-sectional areas decreasing from pole to pole at a constant rate and a plane of symmetry of one pole coinciding with a plane of symmetry of the other pole.

5. An electromagnet comprising north and south iron polar pieces and a winding for the north polar piece adapted to create a pulsating magnetic field between said polar pieces; said north polar piece having a plane facial area of substantial extent but relatively smaller than the opposed face of the south polar piece and arranged to concentrate the lines of force of said field at a focal point within said north polar piece, and said south polar piece being constructed with a depressed central portion having effectively decreasing thickness of metal from an outer edge towards the center of said depressed portion.

ROBERT CADY BURT.